F. E. & I. DELGADO.
DETACHABLE TRACTION TREAD.
APPLICATION FILED FEB. 11, 1916.
1,264,617.
Patented Apr. 30, 1918.
2 SHEETS—SHEET 1.
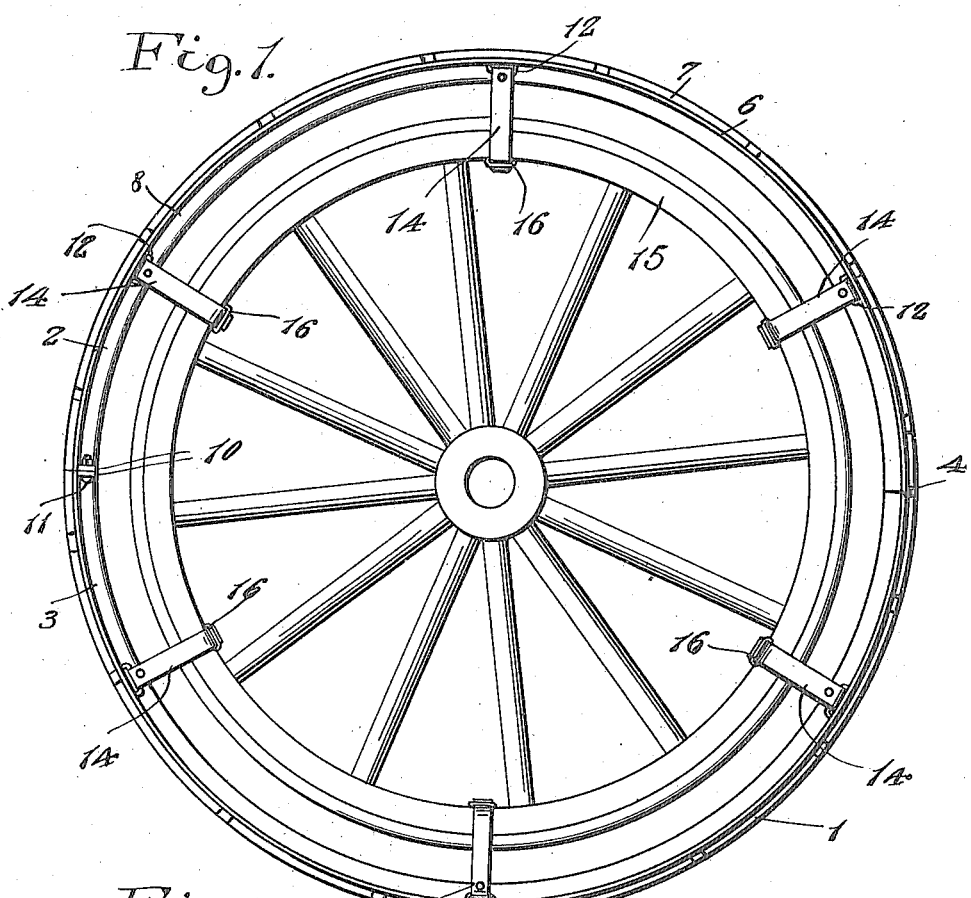
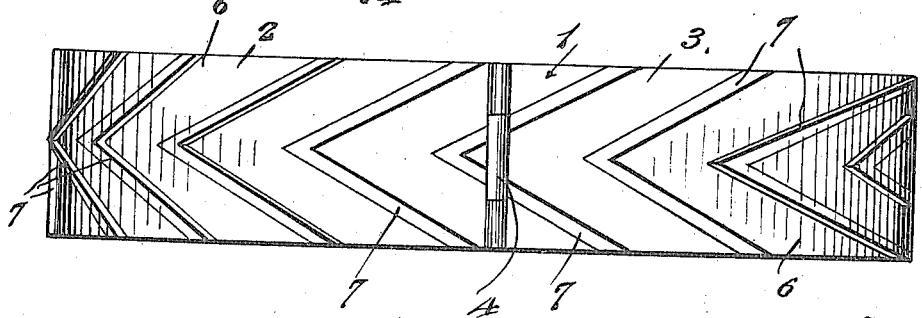
Witnesses:
Inventors
F. E. Delgado,
I. Delgado.
By
Attorney

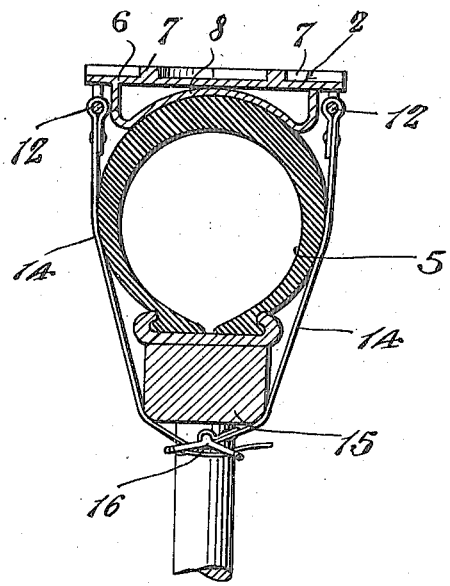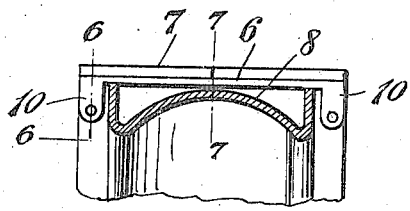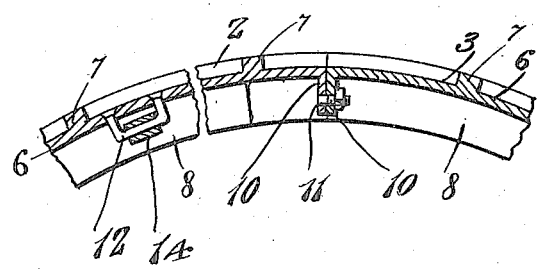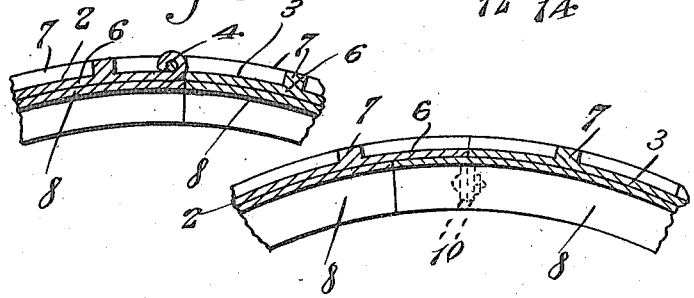

UNITED STATES PATENT OFFICE.

FERNANDO E. DELGADO AND ILDEBERTO DELGADO, OF SANTA FE, NEW MEXICO.

DETACHABLE TRACTION-TREAD.

1,264,617.  Specification of Letters Patent.  Patented Apr. 30, 1918.

Application filed February 11, 1916. Serial No. 77,758.

*To all whom it may concern:*

Be it known that we, FERNANDO E. DELGADO and ILDEBERTO DELGADO, citizens of the United States, residing at Santa Fe, in the county of Santa Fe and State of New Mexico, have invented certain new and useful Improvements in Detachable Traction-Treads; and we do hereby declare the following to be a full, clear, and exact description of the invention, such as will enable others skilled in the art to which it appertains to make and use the same.

This invention relates to a detachable traction tread adapted for mounting upon the wheels of a motor vehicle, and the primary object of the invention is to provide a flat tread adapted for mounting about the tread portion of an ordinary pneumatic tire for adapting the vehicle for travel over sandy surfaces, or loose ground such as is found in farm work.

Another object of the invention is to provide a traction tread as specified, which is composed of a pair of hingedly connected semi-circular members having flat tread portions substantially equal in width to the diameter of the pneumatic tire upon which they are to be mounted, and plates which are secured to the inner surface of the tread portion and shaped to snugly fit about the tread portion of an ordinary pneumatic tire.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved tread showing the same applied to an ordinary motor vehicle wheel.

Fig. 2 is a plan view of the tread.

Fig. 3 is a cross sectional view through the improved traction tread showing the same applied to an ordinary pneumatic tire.

Fig. 4 is a fragmentary view showing the end of one of the semi-circular sections of the traction tread.

Fig. 5 is a section through the pivoted portions of the semi-circular sections.

Fig. 6 is a fragmentary sectional view through the meeting ends of the sections showing the manner of connecting the same on the line 6—6 of Fig. 4.

Fig. 7 is a sectional view through the meeting ends of the semi-circular sections of the traction tread on the line 7—7 of Fig. 4.

Referring more particularly to the drawings 1 designates the improved traction tread as an entirety, which is composed of semi-circular members 2 and 3. The members 2 and 3 are hingedly connected as is shown at 4 so as to permit their ready and easy mounting about the tread portion of an ordinary pneumatic tire such as indicated at 5 in Fig. 3 of the drawings.

Each of the sections 2 and 3 comprise a flat tread plate 6 which has a plurality of cleats 7 attached to its outer surface for preventing skidding of the vehicle upon which it is mounted. The tread portions 6 of the semi-circular member 2 and 3 have plates 8 secured to their inner surfaces in any suitable manner which plates are bent to conform to the configuration of the tread portions of the pneumatic tire 5 so as to provide a relatively firm connection between the traction tread and the pneumatic tire. The plate 8 which is attached to the inner surface of the tread 6 of the section 2 is cut away as clearly shown in Fig. 7 of the drawings so as to permit the plate 8 which is attached to the inner surface of the tread 6 of the section 3 to overlap the joints formed by the meeting of the free ends of the sections 2 and 3 as clearly shown in Fig. 7 of the drawings. The treads 6 of the sections 2 and 3 have depending ears 10 formed on their free edges which ears are adapted for engagement with each other, when the traction tread is mounted upon a vehicle wheel, and bolts indicated at 11 are inserted through the ears 10 for securely connecting the sections 2 and 3 and holding them in place upon the tread of the pneumatic tire.

A plurality of metallic straps 12 are secured to the inner surface of the treads 6 adjacent their side edges, to which straps are attached flexible straps 14 which extend along the sides of the pneumatic tire 5, about the wheel rim 15 and are connected in any suitable manner preferably by the ordinary buckle structure as shown at 16 for holding the traction tread securely in place upon the pneumatic tire.

In reducing the invention to practice certain minor features of construction, combination and arrangement of parts may necessitate alterations to which the patentees are entitled provided such alterations are comprehended within the scope of what is claimed.

What is claimed is:—

A demountable traction tread structure including a flat tread portion having a plurality of cleats formed upon the tread surface thereof, and a tire engaging portion formed upon its inner surface, said tire engaging portion including a concavely curved portion adapted to engage only the tread portion of a pneumatic tire, and side portions extending at right angles to and connected with the inner surface of said tread portion inwardly of the edges of the tread portion, and means connected to said tread portion outwardly of said side portions for detachably connecting the traction tread to a wheel carrying a pneumatic tire.

In testimony whereof we affix our signatures in presence of two witnesses.

FERNANDO E. DELGADO.
EDDY DELGADO.

Witnesses:
A. W. KAUNE,
ROBT. W. LYNN.

Copies of this patent may be obtained for five cents each, by addressing the "Commissioner of Patents, Washington, D. C."